United States Patent [19]

Friedrich et al.

[11] Patent Number: 4,732,576
[45] Date of Patent: Mar. 22, 1988

[54] MOTOR FUEL AND FUEL OIL EMULSIONS USING A SALT AS EMULSIFIER

[75] Inventors: Werner Friedrich, Herten; Hans Maag, Marl; Heinz Reimer, Bottrop, all of Fed. Rep. of Germany

[73] Assignee: Huels Aktiengesellschaft, Marl, Fed. Rep. of Germany

[21] Appl. No.: 884,583

[22] Filed: Jul. 11, 1986

[30] Foreign Application Priority Data

Jul. 13, 1985 [DE] Fed. Rep. of Germany ....... 3525124

[51] Int. Cl.$^4$ .............................................. C10L 1/32
[52] U.S. Cl. ...................... 44/51; 252/356; 252/357; 252/309; 44/53; 44/71
[58] Field of Search ............... 44/51, 53, 71; 252/309, 252/356, 357

[56] References Cited

U.S. PATENT DOCUMENTS

| | | |
|---|---|---|
| 3,756,794 | 9/1973 | Ford . |
| 4,046,519 | 9/1977 | Piotrowski . |
| 4,295,859 | 10/1981 | Boehmke ................................. 44/51 |
| 4,315,755 | 2/1982 | Hellsten et al. ......................... 44/51 |
| 4,395,266 | 7/1983 | Han ........................................ 44/51 |
| 4,465,494 | 8/1984 | Bourrel et al. .......................... 44/51 |
| 4,512,774 | 4/1985 | Myers et al. ............................ 44/51 |

FOREIGN PATENT DOCUMENTS 0012202 10/1979 European Pat. Off. .
1545509 12/1966 Fed. Rep. of Germany .

Primary Examiner—Jacqueline V. Howard
Attorney, Agent, or Firm—Millen & White

[57] ABSTRACT

Motor fuels or fuel oils in the form of an emulsion contain water, an emulsifier and optionally an alcohol, the emulsifier being at least 25% by weight of a compound of the general formula:

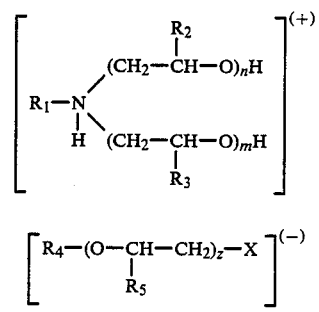

wherein
$R_1$ and $R_4$ are saturated or unsaturated, straight-chain or branched hydrocarbon aliphatic radicals with 4 to 24 C atoms, $R_4$ can also be an alkylphenyl radical of 1 to 18 C atoms in the optionally branched, alkyl chain or H; $R_2$, $R_3$ and $R_5$ represent a methyl group or H, n and m is a number from one to 20 plus z from 0 to 15, and X is an acid radical —COO$^{(-)}$ or —OCH$_2$COO$^{(-)}$. The emulsions are especially stable and of low viscosity.

21 Claims, No Drawings

MOTOR FUEL AND FUEL OIL EMULSIONS USING A SALT AS EMULSIFIER

BACKGROUND OF THE INVENTION

This invention relates to fuels, e.g., motor fuels for internal combustion engines and fuel oils, e.g., for oil-burning installations, in emulsion form, and containing water and emulsifiers. Furthermore, it relates to the use of an emulsifier system for the production of motor fuels and fuel oils.

It is already known that addition of water or motor fuels and fuel oils has a positive effect on the combustion process. A reduction in the amount of harmful exhaust gas components, above all nitrogen oxides and carbon black (cf. Chemical Engineering, Nov. 11, 1974, pages 84–88), is especially observed. Water has conventionally been injected via nozzles into combustion chambers. Primarily, water has been introduced directly into the motor fuel or the fuel oil. Since water is immiscible with motor fuels and fuel oils, emulsions have been formed using emulsifiers. Thus far, nonionic emulsifiers have been used exclusively for this purpose (cf. DE-OS No. 15 45 509, DE-OS No. 19 37 000=U.S. Pat. No. 3,756,794).

The water-motor fuel or water-fuel oil emulsions produced with nonionic emulsifiers where they exhibit adequate stability, are so highly viscous that below $+5°$ C. their permeability through filters and nozzles disappears. If they are set for low viscosity, then they exhibit inadequate stability, i.e., the phases separate. According to No. EP-Bl-0 012 202, the stability of motor fuel- and fuel oil-water emulsions which contain a nonionic emulsifier can be improved by special cleaning precautions. For example, the emulsifiers exhibit less than 1000 ppm of salt proportions, less than 1% by weight of polyalkylene glycol ether and less than 1% by weight of glycerol and/or polyglycerol. It is obvious that such costly cleaning operations seriously burden an industrial process.

SUMMARY OF THE INVENTION

It is an object of this invention to provide improved water/motor fuel or fuel oil emulsions.

Upon further study of the specification and appended claims, further objects and advantages of this invention will become apparent to those skilled in the art.

These objects have been achieved by the surprising finding that these disadvantages of the prior art can be avoided in the case of motor fuels for internal combustion engines or fuel oils in the form of an emulsion which contain water, an emulsifier and optionally an alcohol, when the emulsifier comprises at least 25% by weight of one or several compounds of the general formula:

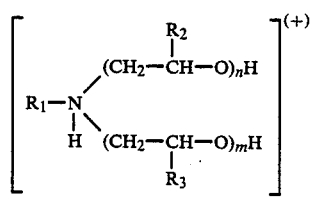

-continued

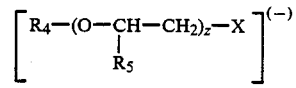

wherein
$R_1$ and $R_4$ each independently is a saturated or unsaturated, straight-chain or branched hydrocarbon aliphatic radical each of 4 to 24 C atoms (e.g., alkyl or alkenyl) or $R_4$ also can be alkylphenyl of 1 to 18 C atoms in the optionally branched alkyl chain or H; $R_2$, $R_3$ and $R_5$ each independently represents a methyl group of H; n plus m is be a number from 1 to 20; z can be a number from 0 to 15; and X is $—COO^{(-)}$ or $—OCH_2COO^{(-)}$. The substituents $R_2$, $R_3$, and $R_5$ can also be different in different monomer units of each chain.

Advantageously, the water content in the emulsion will be 1 to 20% by weight and the emulsifier content 0.5 to 5% by weight, both in relation to the weight of the entire emulsion. The remainder of the emulsion comprises the oil and other optional ingredients discussed herein or known to a skilled worker.

The invention also involves the use of an emulsifier of the general formula

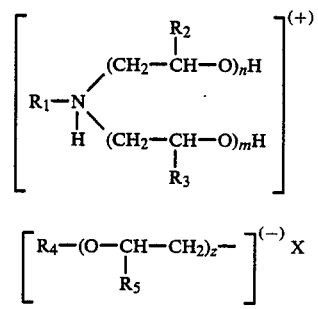

as defined above, for the production of motor fuels for internal combustion engines or fuel oils in the form of an emulsion, which fuels or fuel oils contain water, one or more emulsifiers and optionally an alcohol.

Advantageously, the emulsifier comprises at least 25% by weight, preferably 50% by weight and most preferably 100% by weight of one or more compounds of the formula above.

Where more than one such compound is utilized, each one normally should be included in an amount of at least 20 weight-%, the precise relative amounts have to be adjusted to the HLB-value of the system in question (content of water, type of oil). Typically from 1–3 compounds are employed.

Thus far, the technical literature exclusively describes nonionic compounds as emulsifiers for motor fuel- and fuel oil-water emulsions, as discussed above. In the above cited EP-Bl it was even pointed out that traces of salts would have to be removed from the nonionic emulsifiers to prevent a separation of the emulsions. Therefore, it is completely surprising that the extraordinarily stable motor fuel- and fuel oil-water emulsions of this invention contain emulsifiers which are salts.

The extraordinary stability of the emulsions according to the invention (water-in-oil emulsions) can be immediately seen from their particle size and their external appearance: since the particle size is clearly below 100 nm and moreover the emulsions are almost transparent, microemulsions exist. As is known, the microemulsion range starts at a particle size of below 100 nm (cf. also Lissant, Microemulsions, Marcel Dekkar Publishing House, Inc., New York and Basel 1984). As is further known, microemulsions are distinguished by an extraordinarily high stability since they represent an energetically favorable condition. (Cf. Stache, Tensid-Taschenbuch, Carl Hanser Verlag, Munich, 2d edition 1981).

Typical particle size for the water droplets according to this invention is between 25 and 35 μm.

A further surprising advantage of the emulsions according to the invention is in the fact that they are from a highly fluid to at most a low viscosity nature and thus are excellently suited, e.g., also for winter operation in motor vehicles. Typically, the emulsions of this invention will have low viscosities in the range of 4-15 mPa·s (20° C.). There have already been reports on the production of microemulsions from motor fuels and water (U.S. Pat. No. 4,046,519); however, tests have shown that microemulsions can not be achieved in the manner described there (comparison test 2).

It is not absolutely necessary to employ exclusively the emulsifiers to be used according to the invention; good results are also readily achieved if at least 25% by weight of the total emulsifier content is present in the form of the salt-like emulsifier to be used according to the invention (cf. Example 6).

Suitable conventional emulsifiers which can be used together with the emulsifiers of this invention include above all the nonionic types of compounds such as alkylpolyglycol ethers, alkylarylpolyglycol ethers, carboxylic acid polyglycol esters, alkylaminopolyglycol ethers, and carboxylic acid amide polyglycol ethers. Typical non-limiting examples include oxyethyl(-propyl)ation products, containing 1 to 30 moles of ethylene oxide and/or propylene oxide, of alcohols of 8 to 22 C atoms, of alkyl-1,2-glycols of fatty acids, of fatty acid amides, of fatty amines, of synthetic fatty acids, of naphthenic acids, of resin acids, of alkylphenols, of arylalkyl phenols or of esterification products of fatty acids with glycerol or of polyalcohols. These can be used singly or in admixture.

These nonionic emulsifiers can be obtained, e.g., by reaction of 2 to 50 moles of ethylene oxide or ethylene oxide and propylene oxide with (a) an alcohol of 8 to 22 C atoms, which can be straight-chain or branched, saturated or unsaturated, with (b) an alkyl-1,2-glycol of 10 to 22 C atoms, with (c) a fatty acid of 10 to 22 C atoms, which can be saturated or unsaturated, straight-chain or branched, with (d) oleoresin acids or naphthenic acids, with (e) an alkyl phenol, such as nonyl or dodecylphenol or arylalkyl phenols or with (f) fats, such as castor oil, coconut fat, palm oil, tallow or lard, sunflower oil, safflower oil, olive oil and the like. These are all conventionally available.

Emulsifiers to be used according to the invention are, e.g., salts from an aliphatic amine, with an optionally unsaturated, or branched alkyl chain, of 4 to 24 C atoms, which alkylamine optionally can contain 1 to 20 polyglycol ether groups of ethylene oxide and/or propylene oxide units, and a compound containing acid groups such as an optionally unsaturated or branched, carboxylic acid of 4 to 24 C atoms (exclusive of the carboxy or —OCH$_2$COO$^-$ group), a C$_{4-24}$-alkyl or C$_{4-24}$-alkenyl or (C$_{1-18}$-alkyl)aryl-mono or polyglycol ether acid (COO— or OCH$_2$COO—), or such an acid of an alkylaryl group containing 1-18, preferably 4 to 12 C atoms in the alkyl radical, or such an acid of a mono- or polyglycol ether group with 1 to 15 ethylene oxide and/or propylene oxide units.

Suitable according to the invention thus are emulsifiers that can be derived from amines, e.g., butylamine, pentylamine, hexylamine, heptylamine, octylamine, nonylamine, decylamine, undecylamine, laurylamine, tridecylamine, tetradecylamine, pentadecylamine, palmitylamine, stearylamine, arylalkylamine, biphenylamine, lignocerylamine, as well as from unsaturated and branched amines, of the same C number, e.g., oleylamine, 2-ethylhexylamine, or commercial or other mixtures, such as coconut fat amine, tallow amine, etc. These amines can be reacted with acids directly. The reaction can also be preceded by a reaction with 1 to 20 moles, preferably 4 to 8 moles of ethylene oxide and/or propylene oxide, especially 4 to 8 moles of ethylene oxide. Then the reaction with the acid takes place.

The following are exemplary of those which can be used as acids: carboxylic acids of 4 to 24 C atoms, such as butyric acid, valeric acid, caproic acid, heptylic acid, caprylic acid, nonylic acid, capric acid, undecylic acid, lauric acid, tridecylic acid, myristylic acid, n-pentadecanoic acid, palmitic acid, stearic acid, arachidic acid, behenic acid, lignoceric acid, as well as the branched and unsaturated types of the same C numbers, such as palmitoleic acid, oleic acid, gadoleic acid, etc. Also useful are alkylpolyglycol ether acetic acids with 4 to 24 C atoms in the optionally unsaturated or branched, aliphatic radicals which are derived from optionally unsaturated or branched alcohols. The following are suitable as such alcohols: butanol, pentanol, hexanol, heptanol, octanol, nonanol, decanol, undecanol, lauryl alcohol, tridecanol, tetradecanol, pentadecanol, hexadecanol, heptadecanol, octadecanol, arachidyl alcohol, behenyl alcohol, lignoceryl alcohol, as well as the corresponding branched or unsaturated types of the same C number, such as isooctyl alcohol, oleyl alcohol, etc. Also suitable are alkylphenylpolyglycol ether acetic acids, which are derived from alkyl phenols of 1-18, preferably 4 to 12 C atoms in the alkyl chain, such as butylphenol, pentylphenol, hexylphenol, heptylphenol, octylphenol, nonylphenol, decylphenol, undecylphenol, dodecylphenol, etc. These alcohols or phenols are reacted with 1-15, e.g., 1 to 10, preferably 4 to 8 moles of ethylene oxide and/or propylene oxide. They are especially reacted with 4 to 8 moles of ethylene oxide. The alkylpolyether alcohols so produced can then be reacted in the usual manner to produce alkypolyethercarboxyl methylate, e.g., by reaction with chloroacetic acid or chloroacetate (cf., e.g., EP-A1-0 No. 106 018) or also by oxidation.

Furthermore, suitable acids are alkylbenzene carboxylic acids of 4 to 12 C atoms in the optionally branched alkyl chain, such as butyl-, pentyl-, hexyl-, heptyl-, octyl-, nonyl-, decyl-, undecyl- and dodecylbenzene carboxylic acids.

The salts, i.e., the emulsifiers to be used according to the invention, can be produced fully conventionally by mixing the amine with the acid without heating, i.e., at room temperature.

All of the emulsifiers useful in accordance with this invention per se are known and are preparable fully conventionally from known starting materials. Many are also commercially available.

Suitable motor fuels include: all commercial regular and super engine fuels, lead free and diesel fuels, heavy oils, and the like.

As fuel oils there are suitable all light, medium and heavy oils, crude oils, e.g., shale oil, which are suitable for oil-burning installations.

In case of desired operation below 0° C., it is recommended that these be added to the emulsion substances lowering the freezing point, such as monovalent alcohols, e.g., alkanols of 1–8 C atoms. Non-limiting examples are methanol, ethanol, propanol, isopropanol, butanol, isobutanol, and 2-ethylhexanol.

The motor fuel emulsions according to the invention generally contain for example:
50 to 97% by weight of gasoline or diesel oil
0.5 to 35%, preferably 8–15% by weight of water
0.3 to 6.0% by weight of the salt to be used as emulsifier according to the invention
0 to 15.0% by weight of an alcohol, e.g., an alkanol, whereby the total % by weight is 100.

The fuel oil emulsions according to the invention generally contain for example:
50 to 97% by weight of fuel oil
0.5 to 35%, preferably 8–15% by weight of water
0.3 to 6.0% by weight of the salt to be used as emulsifier according to the invention.

The motor fuel and fuel oil emulsions according to the invention can be produced by simply mixing the components, e.g., by stirring of water into the solution made up of emulsifier and fuel or fuel oil. The described water-in-oil emulsions are produced without application of additional shearing forces.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated.

EXAMPLE 1

87.5 ml of diesel fuel is mixed with 2.5 ml of a reaction product from 1 mole of oleylamine with 6.2 moles of ethylene oxide and 1 mole of oleic acid and then added under stirring to 10.0 ml of demineralized water in portions of about 1 ml. After a short time an extremely stable, highly fluid, almost transparent, grey-blue water-in-oil emulsion with an electrical conductivity of $1.3 \times 10^{-3}$ $\mu$S·cm$^{-1}$ and particle diameters of 32–35 nm is formed. The dynamic viscosity amounts to 4.7 mPa·s at 20° C. (highly fluid) and 27.8 mPa·s at 0° C. (with low viscosity).

A comparable emulsion is obtained if in place of the reaction product from 1 mole of oleylamine with 6.2 moles of ethylene oxide and 1 mole of oleic acid, a reaction product consisting of 1 mole of oleylamine with 1 mole of propylene oxide and 6.0 moles of ethylene oxide and 1 mole of oleic acid is used.

EXAMPLE 2

84.5 ml of diesel fuel is mixed with 3.0 ml of ethyl alcohol and 2.5 ml of a reaction product from 1 mole of oleylamine with 5.6 moles of ethylene oxide and 1 mole of oleic acid and then is added under stirring to 10.0 ml of demineralized water in portions of about 1 ml. After a short time an extremely stable, highly fluid, almost transparent, grey-blue water-in-oil emulsion with a dynamic viscosity of 4.7 mPa·s at 20° C., 14.4 mPa·s at 0° C. and 27.4 mPa·s at $-10°$ C. (with low viscosity) is formed. This emulsion is suitable especially as diesel fuel also in winter operation.

EXAMPLE 3

84.5 ml of diesel fuel is mixed with 3.0 ml of ethyl alcohol and 2.5 ml of a reacton product from 1 mole of i-nonylphenolpolyglycolether acetic acid with 6.0 ethylene oxide units and 1 mole of $C_{16-18}$ tallow fat amine and then added under stirring to 10.0 ml of demineralized water in portions of about 1 ml. After ashort time an emulsion is formed which is equivalent to that described in Example 2 externally and in terms of application.

EXAMPLE 4

87.5 ml of regular gasoline is mixed with 2.5 ml of a reaction product from 1 mole of oleylamine with 6.3 ethylene oxide units and 1 mole of oleic acid and added under stirring to 10.0 ml of demineralized water in portions of about 1 ml. After a short time an extremely stable, highly fluid, almost transparent, grey-blue water-in-oil emulsion is formed with a dynamic viscosity of 3.2 mPa·s at 20° C. and particle diameters of 33–35 nm.

EXAMPLE 5

93.5 ml of commercial fuel oil is mixed with 1.5 ml of a reaction product from 1 mole of oleyl amine with 6.1 ethylene oxide units and 1 mole of $C_8$–$C_{18}$ coconut fatty acid and added under stirring to 5.0 ml of demineralized water. After brief stirring, an almost clear extremely stable water-in-oil emulsion is formed (34–36 nm particle size, 7.5 mPa·s at 20° C.).

COMPARISON TEST 1 AND EXAMPLE 6

81.8 ml of commercial fuel oil is added to 2.0 ml of lauryl alcohol oxethylate (5 ethylene oxide units/mole) and 15.0 ml of demineralized water is added under agitation in portions of about 1 ml. A viscous milky-white emulsion with a dynamic viscosity of 100 mPa·s at 20° C. (of high viscosity) is formed. This emulsion can no longer be used in winter operation and exhibits initial separation phenomena as early as after 24 hours shelf life; about 1 ml of water as a clear lower phase and about 5 ml of clear upper fuel oil phase.

If this emulsion is added additionally to 1.2 ml of a reaction product consisting of 1 mole of $C_{16-18}$ tallow fat amine with 4 ethylene oxide units and 1 mole of tallow oil fatty acid with a resin acid content of <2%, its appearance changes spontaneously. An extremely stable, highly fluid, almost transparent, grey-blue water-in-oil emulsion develops with a dynamic viscosity of 6.0 mPa·s at 20° C.

Comparable results are achieved if in place of the lauryl alcohol oxethylate (5 ethylene oxide units/mole), an i-nonylphenoloxethylate with 5.2 ethylene oxide units/mole is used.

COMPARISON EXAMPLE 2

2.25 g of a mono and diester consisting of glycerol and oleic acid, which, e.g., can be produced by condensation of 1 mole of glycerol and 1.5 moles of oleic acid (olein), and 0.25 g of bis(2-hydroxyethyl)stearylamine (weight ratio=9:1) are dissolved in 87.5 ml of diesel fuel and added under stirring to 10.0 ml of demineralized water in portions of about 1 ml. A grey-white emulsion is formed which decomposes into two phases already after a few hours of shelf life. Even by adding up to 19 parts of methanol and changing the weight ratios of the two emulsifier components, no noticeable improvement of the emulsion stability takes place. The same results are achieved if in place of the diesel fuel, e.g., a commercial regular or super motor fuel is used.

EXAMPLE 7

87.5 ml of a super motor fuel, lead-free, is added to 2.5 ml of the reaction product from 1 mole of lauryl amine with 2.5 moles of ethylene oxide and 1 mole of lauryl alcohol polyglycol ether acetic acid with 20 ethylene oxide units and subsequently added with stirring to 10.0 ml of demineralized water in portions of about 1 ml. After a short time there is formed an extremely stable, highly fluid, almost transparent, grey-blue water-in-oil emulsion with a dynamic viscosity of 3.1 mPa·s at 20° C. and particle diameters of 32–34 nm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a water/oil emulsion comprising combustion effective amounts of water, a motor fuel useful for internal combustion engines or a fuel oil and an emulsifier, the improvement wherein the emulsifier comprises at least 25% by weight of a compound of the formula:

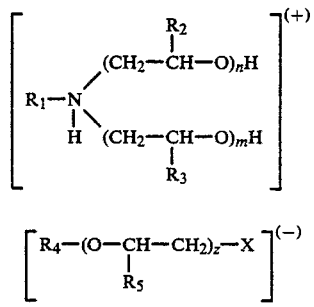

wherein
$R_1$ and $R_4$ each independently is alkyl or alkenyl of 4 to 24 C atoms, and $R_4$ can also be alkylphenyl of 1 to 18 C atoms in the alkyl portion or H; $R_2$, $R_3$ and $R_5$ each independently is methyl or H; n plus m is a number from 1 to 20; z is 0 to 15; and X is $-COO^{(-)}$ or $-OCH_2COO^{(-)}$.

2. An emulsion of claim 1, wherein the oil is a motor fuel oil.

3. An emulsion of claim 2, wherein the amounts of ingredients are 50–97% by weight of oil, 0.5 to 35% by weight of water: 0.3 to 6.0% by weight of emulsifier and 0–15% by weight of a lower alkanol.

4. An emulsion of claim 1, wherein the oil is a fuel oil.

5. An emulsion of claim 4, wherein the amounts of ingredients are 50–97% by weight of oil, 0.5 to 35% by weight of water and 0.3 to 6.0% by weight of emulsifier.

6. An emulsion of claim 1, wherein the emulsifier comprises at least 50% of a compound of said formula.

7. An emulsion of claim 6, wherein the emulsifier comprises substantially 100% of a compound of said formula.

8. An emulsion of claim 3, wherein the emulsifier comprises substantially 100 wt% of a compound of said formula.

9. An emulsion of claim 4, wherein the emulsifier comprises substantially 100 wt% of a compound of said formula.

10. An emulsion of claim 5, wherein the emulsifier comprises substantially 100 wt% of a compound of said formula.

11. An emulsion of claim 1, wherein in said formula n and m are 0.

12. An emulsion of claim 1, wherein in said formula n and m are 1–10.

13. An emulsion of claim 1, wherein $R_4$ is alkylphenyl.

14. An emulsion of claim 1, wherein z is 0.

15. An emulsion of claim 1, wherein z is 1–15.

16. An emulsion of claim 1, wherein X is $-OCH_2COO^{(-)}$.

17. An emulsion of claim 2, further comprising an amount up to 15% by weight of a lower alkanol.

18. An emulsion of claim 3, wherein the amount of water is 8–15% by weight.

19. An emulsion of claim 5, wherein the amount of water is 8–15% by weight.

20. A method of lowering the viscosity of an emulsion of water, a motor fuel oil or a fuel oil, and an emulsifier, comprising using as at least 25% of said emulsifier, a compound of the formula:

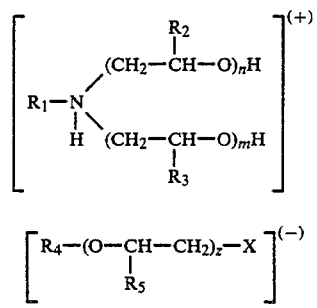

wherein
$R_1$ and $R_4$ each independently is alkyl or alkenyl of 4 to 24 C atoms, and $R_4$ can also be alkylphenyl of 1 to 18 C atoms in the alkyl portion or H; $R_2$, $R_3$ and $R_5$ each independently is methyl or H; n plus m is a number from 1 to 20; z is 0 to 15; and X is $-COO^{(-)}$ or $-OCH_2COO^{(-)}$.

21. In a method of operating an internal combustion engine comprising feeding fuel into said engine, the improvement wherein said fuel is the water/oil emulsion of claim 1.

* * * * *